United States Patent Office 2,810,586
Patented Oct. 22, 1957

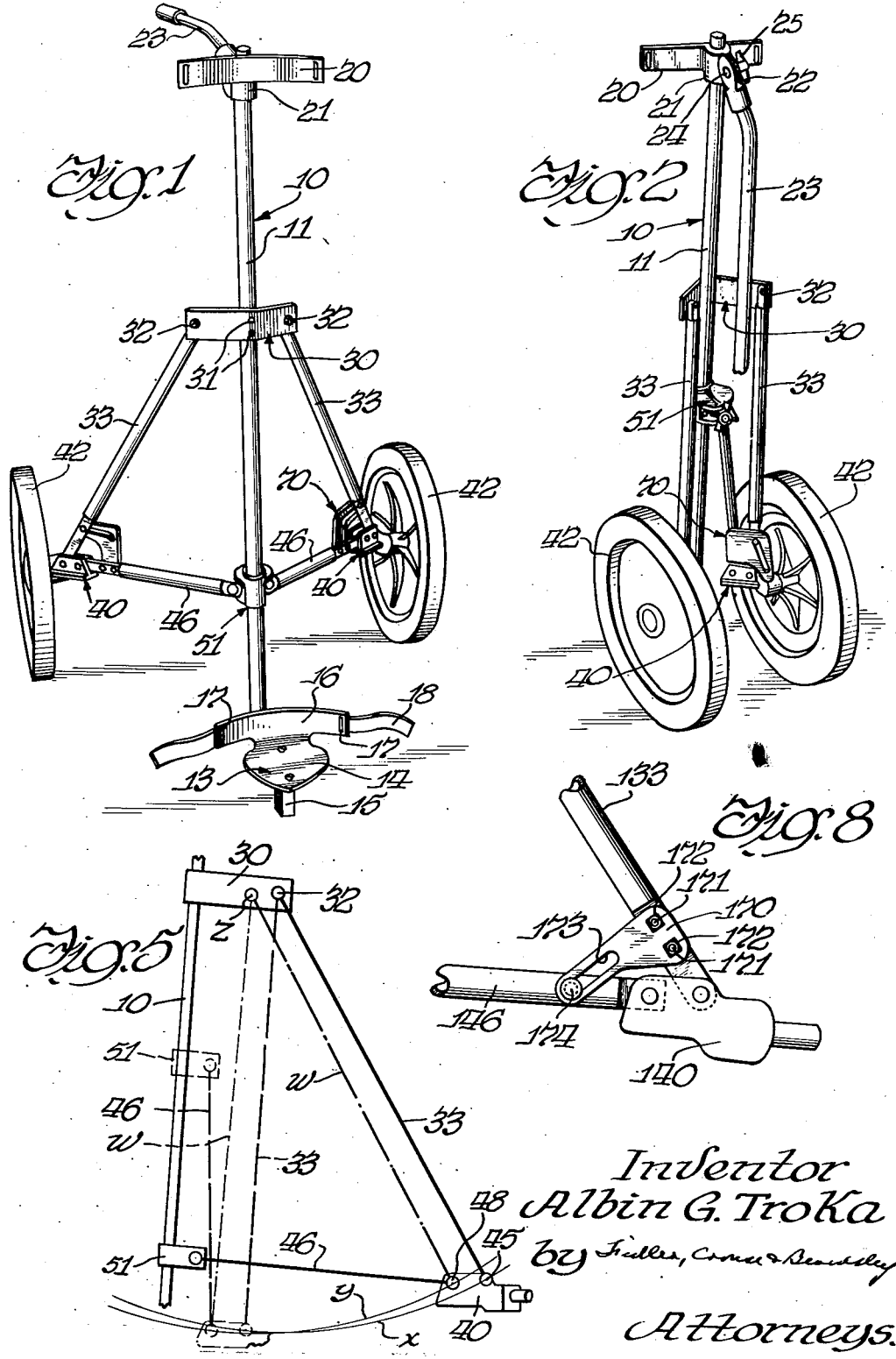

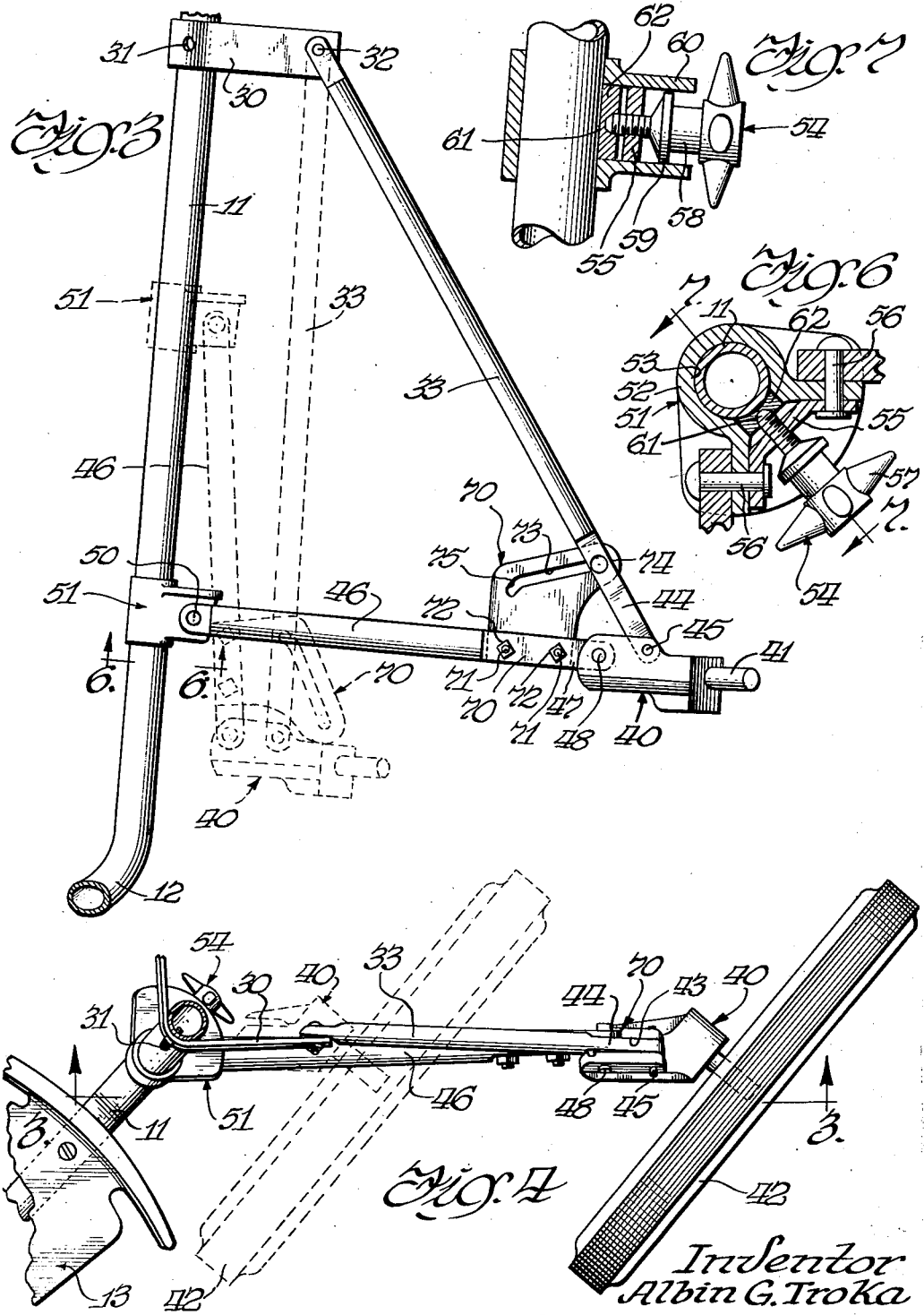

2,810,586

GOLF BAG CART

Albin G. Troka, Des Plaines, Ill., assignor to National Die Casting Company, Chicago, Ill., a corporation of Illinois Application August 24, 1955, Serial No. 530,386

6 Claims. (Cl. 280—40)

This invention relates generally to golf bag carts and has to do more particularly with a golf bag cart of the collapsible type having a novel wheel mounting mechanism whereby the wheels may be readily moved from an extended normal-use position to a collapsed storage position, the wheels being maintained in parallelism in both conditions of the cart.

An object of the present invention is to provide a golf cart having a new and improved wheel mounting arrangement whereby the wheels may be readily moved from an extended, normal-use position outwardly and rearwardly of the main supporting shaft or backbone of the carrier to a position close to and substantially in alignment with the backbone in both of which positions the wheels are maintained in parallelism.

Another object of the invention is to provide a golf bag cart having a novel wheel mounting mechanism which is simple and light in construction and which rigidly supports the wheel in both extended and collapsed positions and automatically maintains them in parallelism in both positions.

Still another object of the invention is to provide a golf bag cart having a new and improved wheel mounting mechanism whereby the wheels may be readily moved between extended and collapsed positions, in both of which positions they are maintained in parallelism, which mechanism is so constructed that the wheels are held in either of their two positions by the mechanism and substantially prevented from unintentional movement out of either of such positions, with or without the use of a locking mechanism.

A further object of the invention is the provision of a golf bag cart having a mechanism for supporting the wheels in either extended or collapsed position which mechanism is so constructed as to permit movement of the wheels between such positions with a minimum of effort.

Still another object is to provide a new and improved wheel mounting mechanism for a golf bag cart which is simple and inexpensive in construction and effective in operation.

Other objects and advantages of the invention will appear from the following description taken in connection with the appended drawings wherein:

Figure 1 is a perspective view taken essentially from the front of the cart showing a golf bag cart embodying my invention, the cart being shown in extended or normal-use position;

Fig. 2 is a perspective view of the cart of Fig. 1 in collapsed or storage position;

Fig. 3 is an enlarged fragmentary view of a portion of the wheel-mounting mechanism;

Fig. 4 is a view substantially from above showing the same portion of the mechanism as illustrated in Fig. 3;

Fig. 5 is a diagrammatic view showing the operation of wheel-mounting mechanism;

Fig. 6 is an enlarged fragmentary sectional view taken along line 6—6 of Fig. 3;

Fig. 7 is a vertical sectional view taken along line 7—7 of Fig. 6; and

Fig. 8 is a fragmentary view of a modified form of strut slide arrangement.

Referring now particularly to Fig. 1 the golf bag cart of my invention includes a main shaft or backbone 10 preferably formed from a rigid metal tube and having a main portion 11 and a lower end portion 12 turned approximately at right angles to the main portion 11. Fixedly secured to the lower end portion 12 of the backbone 10 is a combined bag rest and lower bracket 13, which may be of any suitable construction.

The bag rest and bracket 13 includes a floor portion 14 adapted to receive thereon and to support the bottom of a golf bag (not shown). A foot portion 15 depends from the floor portion 14 in position to rest upon the ground, floor or other surface upon which the cart is placed, to provide with the wheels hereinafter described, a stable, three point support for the bag both when in extended condition and when in collapsed condition. Upstanding from and rearwardly of the floor portion 14 is an arcuate bag bracket 16 shaped to receive the side of the bag and having slots 17 inwardly of its end adapted to receive therethrough a belt 18 for encircling the bag and holding it against the bracket 16.

An upper bag bracket 20 generally similar in form to the lower bag bracket 16 is secured to the upper end of the backbone 10. The upper bag bracket 20 is carried by an integral sleeve portion 21 which is received on the upper portion of the backbone 10 and fixedly secured thereto in a similar manner as by a set screw (not shown). Extending rearwardly from the sleeve portion 21 is a handle attaching portion 22 to which a handle 23 is pivoted as by a pivot screw 24 in the usual manner and having a wing head 25 whereby the screw 24 can be tightened to hold the handle 23 in any desired position of adjustment on the handle attaching portion 22. In order to aid in securing the handle 23 in any position of adjustment, the handle and portion 22 may be provided with opposing serrated faces as is known. The handle 23 and its attaching means may be of any conventional form and the specific construction thereof forms no part of the present invention.

Secured to and supporting the backbone 10 is a wheel assembly of novel construction which will now be described. The wheel assembly includes an upper yoke 30 which is fixedly secured to the main portion 11 of the backbone 10, as by roll pins 31. Depending from and pivotally attached to the fixed yoke 30 as by bolts 32 is a pair of upper or outer struts 33 preferably of tubular form and having their upper ends flattened as illustrated particularly in Fig. 4 of the drawings, in order to provide for convenient mounting on the upper yoke 30. It is to be understood that the upper yoke 30 instead of being formed as a flat strap-like member, as shown, may be formed as a casting (not shown) having slots in its outer end in which plugs (not shown) secured to the ends of the upper struts 33 are pivoted. The pivots between each of the upper struts in the fixed yoke 30 are located a substantial distance outwardly from the backbone, for a purpose which will hereinafter appear.

The upper struts 33 carry pivotally at their lower ends axle yokes 40 each of which is provided with a stub axle 41 on which is mounted a wheel 42 consisting of the usual wheel proper and tire. The axle yoke 40 is provided with a slot or groove 43 into whch the flattened lower end 44 of each strut 33 is inserted and pivotally connected as by a roll pin 45. Connected to each of the axle yokes 40 is a lower or inner strut 46 having a flattened end 47 inserted in the slot or groove 43 and pivotally connected to the axle yoke 40 as by a roll pin 48. Each pivot pin 48 is located at a level very slightly below the level of the corresponding pivot pin 45, for a purpose hereinafter explained. The inner end of each of the lower struts 46 is pivotally secured as by a rivet 50 in a lower yoke 51. The lower yoke 51 is formed with a sleeve portion 52 (Fig. 6) having a bore 53 which receives therein the main portion 11 of the backbone 10 whereby the lower yoke 51 is slidably adjustable on the backbone 10 between a lower position (as shown in full lines in Fig. 3) and an upper position (as shown in broken lines in Fig. 3). The lower yoke 51 is adapted to be secured in either of its positions of adjustment by a lock screw 54 which is threaded into a bracket 55 secured to the lower yoke 51 in a suitable manner as by rivets 56.

The screw 54 is provided with a head 57 of such form as to provide for convenient gripping thereof to turn the same and with a shank portion 58 having a flange 59 guided in a screw guide 60 formed in the lower yoke 51. The inner end of the screw 54 is threaded through the bracket 55 and is positioned to enter a socket 61 formed in a shoe 62 carried in the lower yoke 51. When the screw 54 is screwed inwardly to bring the end thereof into engagement with the bottom of the socket 61 of the shoe 62 it forces the shoe 62 into engagement with the backbone 10 and thus frictionally holds the lower yoke 51 in either of its positions of adjustment.

The upper struts 33 are connected to the lower struts 46 in such manner that the axle yokes 40 are constrained to move only translationally and thus the axles 41 are maintained in alignment in all positions of the struts and the wheels are maintained in parallel relation both in their extended positions and their collapsed positions. To this end I provide in the preferred embodiment of the invention, a strut slide 70 connecting each set of struts 33 and 46. The strut slide 70 preferably is formed as a plate member and is rigidly secured to the flattened portion 47 of the lower strut 46 in a suitable manner as by bolts 71 and cooperating nuts 72 although the member may be secured in other ways, as by welding or the like. The strut slide 70 is formed with a slot 73 extending angularly with respect to the lower strut 46. While such angle may be varied considerably I prefer to locate the slot 73 at an angle of approximately 20° relatively to the axis of the lower strut 46. The strut slide 70 is slidably connected to the flattened portion 44 of the upper strut 33 in a suitable manner as by a rivet 74 extending through the flattened portions 44 and through the slot 73 in the strut slide 70. The strut slide 70 thus provides an arrangement whereby upon movement of the lower yoke 51 between its two positions the axle yoke 40 is moved between an outer position substantially rearward of the backbone 10 to an inner position closer to the backbone and inwardly close to the backbone. The arrangement is such that the axles remain in alignment and the wheels remain in parallelism both in the extended and the collapsed position and between such positions.

The strut slide 70 being connected rigidly to the lower strut 46 and connected to the upper strut 33 through the sliding connection provided by the slot 73 and the rivet 74, serves to maintain the struts 46 and 33 in predetermined, varying angular relation, determined by the position of the lower yoke 51 whereby the axle brackets 40 are moved inwardly and outwardly in such manner that the strut axles remain in alignment. It will be noted in this connection that the upper struts are connected to the upper yoke 30 for swinging movement in planes extending at 98° from each other and at 49° to a plane passing from front to rear through the backbone 10. It will be noted also that the lower struts 46 are mounted for swinging movements in substantially the same planes as the upper struts 33 respectively and that the axle brackets 40 move inwardly and outwardly substantially in said planes. Thus, each of the axle brackets and the connected struts move in a plane which is disposed substantially at 45° to a fore-and-aft plane through the backbone and accordingly each of the wheels moves both inwardly toward the other wheel and forwardly toward the backbone as it moves from its extended position to its collapsed position. It will be seen, therefore, that in the extended position the wheels are disposed outwardly away from each other and rearwardly of the backbone and in the collapsed position they are moved inwardly to a position closer to each other and to a position closer (that is in a fore-and-aft direction) to the backbone so that in the collapsed position the backbone is supported in a substantially vertical position whereas in the extended position of the wheels the backbone is supported in a position inclined slightly to the vertical.

It will be now seen that the wheel supporting structure may be moved from its extended position to its collapsed position merely by loosening the locking screw and by sliding the lower yoke upwardly on the backbone. In order to prevent the wheels from dragging on the supporting surface, they may be raised therefrom during the collapsing action by rocking the cart forwardly so that it rests solely on the foot. The upward movement of the lower yoke raises the upper ends and draws the lower ends inwardly, thereby drawing the wheel yokes inwardly. The upper struts and the strut slide connections maintain the axles in mutual alignment. The wheel supporting mechanism is moved into extended position by moving the lower yoke downwardly on the backbone which forces the axle yokes outwardly. The extent of movement of the wheel supporting mechanism in either direction is limited by the extent of movement of the pin in the slot and the two positions of the mechanism are thereby established. This slot establishes a positive position for the collapsed and extended positions thereby eliminating the need of stop screws in the center support tube—or similar means to control travel of movable yoke.

The action of the wheel supporting mechanism in maintaining the axles in parallelism will be understood from a consideration of Fig. 5 to which reference now is made. It will be seen that when the axle yoke is moved from its outer to its inner position the pivot pin 45 moves through a circular arc X about the pivot bolt 32. At the same time the pivot pin 48 moves through a circular arc Y about an imaginary center Z which is positioned inwardly and below the level of the pivot bolt 32 at horizontal and vertical distances equal to the horizontal and vertical distances between the pivot pins 45 and 48. In other words the center Z is located in the same position relatively to the pivot pin 32 that the pivot pin 48 is located relatively to the pivot pin 45 and the imaginary arm W between the center Z and the pin 48 is the same length as the strut 33 between the pivots 32 and 45. The arrangement is such that the wheel supporting mechanism provides the functional equivalent of a parallel motion mechanism insofar as the control over the movement of the axle yoke is concerned and therefore the axle is caused to move translationally between its two positions.

It should be explained, that under certain conditions of design, the construction may be such that during the movement of the mechanism, the center Z may wander very slightly from its position at either limit of movement but this variation in position is so slight that it exerts no material effect on the substantial parallelism of the axles. It is to be understood therefore that where the axles are said to be in "alignment" and the wheels are said to be in "parallelism" it will be understood that these members are in alignment and parallelism except for the aforesaid immaterial variation therefrom.

The construction of my golf cart is such that the wheel supporting mechanism will remain in either position of adjustment (that is, either collapsed position or extended position) under ordinary conditions without locking. At the same time the construction permits the wheels to be moved from one position to the other with a minimum of effort. These advantages result in part from the angular relation between the struts and backbone and in part from the construction of the strut slides.

While the relative dimensions and the angles between the backbone and struts may be varied somewhat from those shown, I have found that satisfactory results may be obtained where the angles are approximately as shown in the drawings. Thus when the wheel supporting mechanism is in extended position, the angle between each lower strut and the backbone is approximately 90°; the angle between the lower strut and the upper strut is approximately 56° and the angle between the upper strut and the backbone is approximately 34°. Thus, while the mechanism tends to remain in such extended position, the resistance to movement toward collapsed position is not substantial. The positioning of the pivots between the upper struts and the fixed yoke permits the attainment of the aforementioned relatively wide angles between the upper and lower struts without the necessity of either unduly lengthening the upper struts or unduly shortening the lower struts.

The arrangement is such that when the wheel supporting mechanism is in collapsed condition, the upper or outer struts depend substantially vertically from the upper yoke, thereby, and thus the wheels tend to remain in collapsed position even if not locked. On the other hand, the lower inner struts are inclined at angles of approximately 10° to the backbone and hence do not unduly resist an opening (downward) force applied to the lower, movable yoke.

The design and arrangement of the strut slides, and particularly the slots therein also contribute to the novel advantages of my cart.

The slot 73 in the strut slide 70 is provided at its inner end with a portion 75 which is turned down and inclined from the major portion of the slide as shown particularly in Fig. 3 of the drawings. Thus, when the wheels are in collapsed position and the rivet 74 is in the inclined or turned down portion 75 of the slot 73 the rivet is lightly held against displacement outwardly along the slide. That is to say the inclined portion of the slide exerts a slight restraining influence on the rivet to resist movement of the rivet outwardly along the slide and thus the strut and axle yoke carried thereby are retained in the collapsed position.

The angle of the slot 73 relative to the lower strut 46 is relatively small (namely, approximately 20°) and the angle of the upper strut 33 relatively to the longitudinal dimension of the slot 73 is approximately 75°. Accordingly, when the cart is in its extended position, the cooperation between the struts 33 and 46 and the strut slide 70 and the rivet 64 is such that the structure tends to remain in its extended condition and to resist any force tending to collapse it except a force tending to move the lower yoke 51 upwardly along the backbone. Thus the cart will remain in extended condition even though the user should neglect to tighten down the screw 54.

In connection with the foregoing it will be understood that it is intended that the user tighten down the nut 54 to secure the wheels in either of their two positions (namely either extended position or collapsed position), but should the user neglect to do so the cart will under normal conditions remain in either of its positions and will not be moved to the other of its positions.

It should be noted that while the strut slide design is such as to aid in retaining the wheel supporting assembly in either of its positions nevertheless the resistance to movement between the two positions is very slight when the same is accomplished by applying a force to the lower yoke in the intended manner.

It should be noted at this point that the arrangement of the pivot axis 48 at a level slightly below the pivot axis 45, hereinbefore mentioned prevents any over-centering action which might tend to lock the struts in extended position.

Instead of attaching the strut slide rigidly to the lower strut and providing a sliding connection with the upper strut as in the construction shown in Figs. 1 to 7 and described above, I may employ the construction shown in Fig. 8. In this form of the invention the strut slide 170 is attached rigidly, as by bolts 171 and nuts 172, or similar means to the upper strut 133 and is connected to the lower strut 146 by a sliding connection comprising a rivet 174 which slides in the slot 173 in the slide 170.

The remainder of the cart forming the second embodiment of my invention preferably is the same as the cart shown in Figs. 1 to 7.

The operation of the second form of cart is the same as that of the first embodiment. The modified slide arrangement functions to provide the same movement of the wheels and struts between open and collapsed conditions as in the first form of cart.

From the foregoing it will be seen that my invention provides a golf bag cart of simple, inexpensive and light construction in which the wheels are so mounted and supported that they remain in parallelism both in the extended use position of the cart and in the collapsed storage position of the cart. The wheel supporting mechanism is simple, compact and is positive in operation and rigidly and firmly supports the wheels in parallelism both in the extended and in the collapsed condition of the cart.

The construction of the cart is such that the majority of the parts forming the cart may be formed simply and inexpensively either as castings or as simple structural shapes such as tubes or plates. The parts may be assembled readily and inexpensively and after assembly require no adjustment. Moreover, the parts may be made strong and rugged but at the same time comparatively light so that while the cart is sufficiently strong and rugged to withstand normal usage and even considerable abuse, nevertheless it is not so heavy or cumbersome as to make it difficult or tiresome to propel it.

Moreover, the wheel supporting mechanism is such that the wheels may be moved between collapsed and extended positions or vice versa readily and with a minimum of effort. As pointed out hereinafter the wheel supporting mechanism is so constructed that while means are provided for locking the wheels in either of the two positions of adjustment, nevertheless, such locking means is not entirely necessary and should the user neglect to operate the locking mechanism to so hold the wheels, they will nevertheless be held in either of their two positions of adjustment under normal conditions of operation.

The wheel supporting mechanism is of such construction as to permit the wheels to be extended to a use position wherein they are in parallelism and spaced apart a distance comparable to that of the wheels in prior golf carts of known construction and to be moved to a collapsed or storage position wherein the wheels are in parallelism spaced apart no further than the wheels or golf carts of prior, known construction. At the same time the construction provides a stable, three point support for the cart in both positions with the backbone being disposed substantially vertically in the collapsed position and being only slightly out of a vertical position when the cart is in extended position.

I claim:

1. A collapsible golf bag cart comprising a main shaft, means carried by said main shaft for supporting a golf bag, an upper yoke secured to said main shaft, a pair of upper wheel struts pivotally connected to said upper yoke, a pair of axle yokes pivotally connected to said upper struts respectively and each carrying an axle, a pair of wheels rotatably mounted on said axles respectively, a single lower wheel strut pivotally connected to each axle yoke, a lower yoke pivotally connected to said lower struts and slidable on said main shaft for adjusting movement between lower and upper positions to thereby move said axle yokes inwardly and outwardly relatively to said main shaft, and cam means for maintaining said axles in alignment in both positions of adjustment thereof, said cam means comprising a cam element secured to each of said upper struts and a cooperating cam element secured to each of said lower struts, at least one of said cam elements of each cooperating pair being secured rigidly to the associated strut.

2. A collapsible golf bag cart comprising a main shaft, means carried by said main shaft for supporting a golf bag, an upper yoke secured to said main shaft, a pair of upper wheel struts pivotally connected to said upper yoke, a pair of axle yokes pivotally connected to said upper struts respectively and each carrying an axle, a pair of wheels rotatably mounted on said axles respectively, a single lower wheel strut pivotally connected to each axle yoke, a lower yoke pivotally connected to said lower struts and slidable on said main shaft for adjusting movement between lower and upper positions to thereby move said axle yokes inwardly and outwardly relatively to said main shaft, and means connected between corresponding upper and lower struts and connected rigidly to at least one of said struts for maintaining said axles in alignment in both positions of adjustment thereof.

3. A collapsible golf bag cart comprising a main shaft, means carried by said main shaft for supporting a golf bag, an upper yoke secured to said main shaft, a pair of upper wheel struts pivotally connected to said upper yoke, a pair of axle yokes pivotally connected to said upper struts respectively and each carrying an axle, a pair of wheels rotatably mounted on said axles respectively, a pair of lower wheel struts pivotally connected to said axle yokes respectively in paired cooperating relation to said upper struts, a lower yoke pivotally connected to said lower struts and slidable on said main shaft for adjusting movement between lower and upper positions to thereby move said axle yokes inwardly and outwardly relatively to said main shaft, and means for limiting the movement of said lower yoke and said upper and lower struts comprising a pair of strut slides each rigidly secured to one strut of each of said cooperating pairs respectively and each of said strut slides having a closed end slot therein and pins secured to the other struts of said cooperating pairs respectively and slidable in said slots respectively.

4. A collapsible golf cart comprising a main shaft, means carried by said main shaft for supporting a golf bag, an upper yoke secured to said main shaft, a pair of upper wheel struts pivotally connected to said upper yoke, a pair of axle yokes pivotally connected to said upper struts respectively and each carrying an axle, a pair of wheels rotatably mounted on said axles respectively, a pair of lower wheel struts pivotally connected to said axle yokes respectively in paired cooperating relation to said upper struts, a lower yoke pivotally connected to said lower struts and slidable on said main shaft for adjusting movement between lower and upper positions to thereby move said axle yokes inwardly and outwardly relatively to said main shaft, and means for maintaining said axles in alignment in both positions of adjustment thereof including a pair of strut slides each rigidly connected to one strut of each of said cooperating pairs respectively and having sliding connection with the other strut of said cooperating pair.

5. A collapsible golf bag cart comprising a main shaft, means carried by said main shaft for supporting a golf bag, an upper yoke secured to said main shaft, a pair of upper wheel struts pivotally connected to said upper yoke for movement respectively in planes including said shaft between positions at acute angles with said shaft and positions approximately parallel thereto, a pair of axle yokes pivotally connected to said upper struts respectively and each carrying an axle, a pair of wheels rotatably mounted on said axles respectively, a pair of lower wheel struts pivotally connected to said axle yokes respectively in paired cooperating relation to said upper struts for respective movement substantially in said planes of movement of said upper struts between positions approximately perpendicular to said main shaft and positions approximately parallel thereto, a lower yoke pivotally connected to said lower struts and slidable on said main shaft for adjusting movement between lower and upper positions to thereby move said axle yokes inwardly and outwardly relatively to said main shaft, and means for maintaining said axles in alignment in both positions of adjustment thereof including a pair of strut slides each rigidly secured to one strut of each of said cooperating pairs respectively and each of said strut slides having a slot therein inclined to both struts of each cooperating pair respectively in all positions thereof and pins secured to the other struts of the cooperating pairs respectively and slidable in said slots respectively.

6. A collapsible golf bag cart comprising a main shaft, means carried by said main shaft for supporting a golf bag, an upper yoke secured to said main shaft, a pair of upper wheel struts pivotally connected to said upper yoke for movement respectively in planes including said shaft between positions at angles of approximately 30° to said main shaft and positions approximately parallel thereto, a pair of axle yokes pivotally connected to said upper struts respectively and each carrying an axle, a pair of wheels rotatably mounted on said axles respectively, a pair of lower wheel struts pivotally connected to said axle yokes respectively in paired cooperating relation to said upper struts for respective movement substantially in said planes of movement of said upper struts between positions approximately perpendicular to said main shaft and positions approximately parallel thereto, a lower yoke pivotally connected to said lower struts and slidable on said main shaft for adjusting movement between lower and upper positions to thereby move said axle yokes inwardly and outwardly relatively to said main shaft, and means for maintaining said axles in alignment in both positions of adjustment thereof including a pair of strut slides one rigidly secured to the lower strut of each of said cooperating pairs respectively and each of said strut slides having a slot therein inclined at an angle of approximately 20° to the said lower strut and pins secured to the upper struts respectively and slidable in said slots respectively.

References Cited in the file of this patent

UNITED STATES PATENTS

| | | |
|---|---|---|
| 1,234,797 | Parmenter | July 31, 1917 |
| 2,646,286 | Troendle | July 21, 1953 |
| 2,658,771 | Rutledge | Nov. 10, 1953 |

FOREIGN PATENTS

| | | |
|---|---|---|
| 518,367 | Great Britain | Feb. 26, 1940 |